United States Patent
Jeschin

(10) Patent No.: US 9,389,604 B2
(45) Date of Patent: Jul. 12, 2016

(54) METHOD AND SYSTEM FOR THE DYNAMIC ALLOCATION OF PROGRAM FUNCTIONS IN DISTRIBUTED CONTROL SYSTEMS

(75) Inventor: Joerg Jeschin, Einbeck (DE)

(73) Assignee: Phoenix Contact GmbH & Co. KG (DE)

( * ) Notice: Subject to any disclaimer, the term of this patent is extended or adjusted under 35 U.S.C. 154(b) by 434 days.

(21) Appl. No.: 14/125,847

(22) PCT Filed: Jun. 29, 2012

(86) PCT No.: PCT/EP2012/002758
§ 371 (c)(1),
(2), (4) Date: Jan. 24, 2014

(87) PCT Pub. No.: WO2013/007349
PCT Pub. Date: Jan. 17, 2013

(65) Prior Publication Data
US 2014/0135950 A1     May 15, 2014

(30) Foreign Application Priority Data

Jul. 12, 2011 (DE) .......................... 10 2011 107 646

(51) Int. Cl.
| | | |
|---|---|---|
| G06F 9/45 | (2006.01) |
| G05B 19/408 | (2006.01) |
| G05B 19/05 | (2006.01) |
| G06F 9/445 | (2006.01) |

(52) U.S. Cl.
CPC .......... *G05B 19/4083* (2013.01); *G05B 19/052* (2013.01); *G06F 9/44521* (2013.01)

(58) Field of Classification Search
None
See application file for complete search history.

(56) References Cited

U.S. PATENT DOCUMENTS

| | | | | | |
|---|---|---|---|---|---|
| 5,909,368 | A | * | 6/1999 | Nixon | G05B 19/0421 700/131 |
| 2003/0037322 | A1 | * | 2/2003 | Kodosky | G06F 3/04817 717/162 |
| 2003/0101021 | A1 | * | 5/2003 | Shah | G06F 9/44505 702/186 |

(Continued)

FOREIGN PATENT DOCUMENTS

| | | |
|---|---|---|
| EP | 2251755 A2 | 11/2010 |
| WO | 2011160695 A1 | 12/2011 |

OTHER PUBLICATIONS

Examiner: Agnes Wittmann-Regis, Related International Patent Application No. PCT/EP2012/002758, "International Preliminary Report on Patentability and Written Opinion", Jan. 23, 2014, Publisher: PCT, Published in: EP.

(Continued)

*Primary Examiner* — Isaac Tecklu
(74) *Attorney, Agent, or Firm* — Kaplan Breyer Schwarz & Ottesen LLP

(57) ABSTRACT

A method and a system are disclosed for allocating program components to distributed control devices of a control system, comprising the following steps: a) creating at least two program modules, which each comprise program components, data interfaces and performance parameters for the definition of a performance requirement; b) linking the program modules via data connections between the data interfaces to form a control program; c) ascertaining available control devices and the performance capability thereof in the control system; d) ascertaining possible allocations of the program modules and verification by a comparison between the requirement and performance capability; e) selecting and allocating a verified allocation; and f) configuring data exchange channels between the distributed control devices.

6 Claims, 3 Drawing Sheets

(56) References Cited

U.S. PATENT DOCUMENTS

| | | | | |
|---|---|---|---|---|
| 2004/0100982 | A1* | 5/2004 | Balasubramanian | G05B 19/0421 370/429 |
| 2006/0053211 | A1* | 3/2006 | Kornerup | G06F 8/34 709/217 |
| 2009/0234468 | A1* | 9/2009 | Doi | G05B 19/0421 700/67 |
| 2009/0265741 | A1* | 10/2009 | Kinoshita | H04N 21/4325 725/43 |
| 2010/0114336 | A1* | 5/2010 | Konieczny | G05B 19/058 700/17 |
| 2012/0291035 | A1* | 11/2012 | Barth | G05B 19/0421 718/102 |
| 2014/0135950 | A1* | 5/2014 | Jeschin | G05B 19/4083 700/86 |

OTHER PUBLICATIONS

"State-of-the-art in Multi-core Processors", "URL: http://www.informatik.uni-augsburg.de/en/forschung/amctf/, abgerufen am Mar. 23, 2012", Jan. 28, 2008, Publisher: AMCTF Augsburg MultiCore Task Force Multicore Research at University of Augsburg.

Examiner: Dr. Markus Zeller, Related German Patent Application No. 10 2011 107 646.1 Search Report, Mar. 26, 2012, Publisher: DPM, Published in: DE.

M. Messelken, Related International Patent Application No. PCT/EP2012/002758 International Search Report, Oct. 1, 2012, Publisher: PCT, Published in: EP.

* cited by examiner

METHOD AND SYSTEM FOR THE DYNAMIC ALLOCATION OF PROGRAM FUNCTIONS IN DISTRIBUTED CONTROL SYSTEMS

FIELD OF THE INVENTION

The present invention relates to a method and to a system for the dynamic allocation of program functions in distributed control systems.

BACKGROUND OF THE INVENTION

Automation technology that is used for process and factory automation or for controlling machinery employs control systems that include one or more distributed control devices, such as a programmable logic controller (PLC), and an application-specific control program. In many cases, the control program is created in a programming language in compliance with the IEC 61131 standard that can be embedded into a computer-assisted development system, for example, which allows the control program for a control system to be created and also for individual program components, such as functions or function blocks, to be created, which can be allocated to one or more of the distributed control devices, for example. For this purpose, an associated programming model is established in terms of how the program components are instantiated and processed. A program that, initially, is created in a platform-independent manner can generally run on different types of hardware, wherein the respective hardware type must have been established before the program is compiled and uploaded.

In the enhanced IEC 61499 standard, the function blocks having interfaces for input and output data (I/O interfaces) known from IEC 61131 are additionally expanded by event interfaces. These event interfaces allow different function blocks to be linked, the respective processing of which can be prompted by an event, which can have been triggered by a different program component within and/or outside of a particular control device. The programming model according to the IEC 61499 standard thus, in principle, allows individual program components within a control system, which are allocated to different control devices, to be linked. A data exchange between the distributed control devices in a control system can take place via a data network, for example via an automation bus system, such as PROFINET. The necessary links between the event interfaces can take place in a control system having a number of distributed control devices by way of a protocol-based data exchange.

However, when an application-specific control program for a control system is created, it must be established which of the program component is to be executed on which of the control device that is distributed in the system. In control systems having distributed control devices, in general this means that there is a fixed assignment between the created program components and the hardware devices.

When control systems are used, the hardware type of a control device is selected from different performance classes based on the task to be processed. The program components are allocated appropriately to the individual control devices during the development of a control program for a control system, wherein the programmer during the distribution must ensure that the available hardware resources of a control device are sufficient for the resource requirements of a respective assigned program component. The physical distribution of the hardware is also reflected in the structure of the entire program of the control system, which is to say in particular with respect to the manually predetermined allocation of the individual program components to the control devices.

Such control systems that are compiled and programmed in an application-specific manner are generally difficult to expand, so that the corresponding control devices generally must be replaced by more powerful ones during a subsequent expansion of a plant or a machine. It is true that future expansions of a plant or of a machine can be considered in the concept design of a control system and in the selection of the appropriate hardware, so that optionally a later replacement of hardware on the control devices can be avoided and merely an adaptation of the control program is necessary. However, the use of an overdesigned control device, which is to say the use of a control device that is too powerful for a particular application, generally conflicts with the cost-efficiency rule.

While generally there is the option of expanding the hardware resources of the entire system, for example by adding a further control device, in control systems that are composed of multiple control devices within a shared data network, effective programming of the system necessitates a reallocation of the existing program components as well as those that were newly added to the available control devices. The reallocation of all program components as well as the establishment of the communication relationships thereof are performed manually by a programmer, so that each expansion basically necessitates a new development of the control program of a control system that already exists.

SUMMARY OF THE INVENTION

It is an object of the present invention to simplify the programmability, in particular with respect to improved scalability of a control system.

To achieve this object, the present invention proposes a method for allocating program components of a control program to at least two control devices that are distributed in a control system, comprising the following steps:
a) creating at least two program modules, wherein each program module is allocated at least one program component, a number of data interfaces and a performance parameter, wherein the performance parameter defines a requirement in regard to the performance capability of a control device and/or a requirement in regard to the performance capability of data exchange channels between the control devices, which are required to be able to execute the program module;
b) linking the program modules among each other to form a control program, wherein data connections are defined between the data interfaces;
c) ascertaining the number and the respective performance capability of the distributed control devices that are available in the control system;
d) ascertaining a number of possible allocations of the program modules to the control devices, wherein the possible allocations are verified by a comparison between the requirement in regard to the performance parameters and the performance capability of the control devices;
e) selecting a verified allocation of the program modules and corresponding allocation of the program components thereof to the distributed control devices; and
f) configuring data exchange channels between the distributed control devices, wherein the defined data connections between the allocated program modules are implemented accordingly.

The linked program modules according to the first two method steps provide a control program for a control system which, at this time, has no relationship yet with real hardware of control devices which is used. The connection between the program components of the linked program modules and the available control devices of a real control system only takes place after the entire control program has been completed. It is only in a further step, which takes place after the entire control program has been completed, that the programmer must establish on which real control devices that are available in a control system the created control program is to be executed. Such an establishment can be made, for example, based on a list that is predetermined by the programming process and includes a data set of real control devices available in a control system.

An essential advantage of the method over the prior art is that the programmer essentially creates a program module-based program solution for particular automation tasks, which initially are not bound to a predetermined target hardware.

A connection of the respective program components and control devices is not made until a later phase, the so-called 'late binding', in which, for example, a development system makes a dynamic allocation of the program components. The imperative specifications defined by the performance parameters are appropriately considered in the dynamic allocation.

The allocation according to method step e) can preferably take place in such a way that essentially uniform utilization of the control device is made possible. Such uniform utilization can be ascertained, for example, by way of an algorithm which is integrated into a development system and for which previously one or more optimization criteria have been selected or predetermined.

Another allocation criterion can be the minimization of the intercommunication of the program modules via the data network or the minimization of the quantity framework of the I/O and event interfaces between the control devices.

An attribute which is used to establish whether a program module requires a particular performance characteristic in a control device for executability can be provided in the performance parameters.

A corresponding performance characteristic can be the requirement of a motion kernel or a processability of secure program parts according to certain SIL (safety integrity level) specifications (IEC/EN 62061 and IEC/EN 61508 standards).

Such an attribute can exclude all the combinations for a program component allocation which do not satisfy these requirements, so that an algorithm for allocation optimization converges accordingly quickly.

Moreover, it can be established in the performance parameters whether a program module is to be carried out redundantly on a number of different control devices.

During the dynamic allocation, the corresponding program component, including the links thereof, are duplicated via the allocated data interfaces, while also being allocated to different controllers. The redundant data exchange channels between the distributed control devices are generated accordingly, without requiring the intervention from a programmer.

Moreover, a value for the quality of service for the data connections can be provided in the performance parameters.

Moreover, a value for a cycle time requirement of the fastest task or for synchronism requirements and update times of I/O interfaces by the performance parameters could be predetermined.

An advantage of the method is that the dynamic allocation takes place automatically following appropriate optimization rules, and can optionally be influenced with manual specifications by way of the performance parameters.

Achieving the object according to the invention additionally includes a development system comprising devices for carrying out the method.

The method and the development system allow simple expandability of existing control systems. The hardware resources of an existing control system can be expanded by adding further hardware, which is to say an additional control device, to the respective data network. An associated and likewise already existing program module-based control program must only be expanded by the additional program modules with appropriate links for the newly added automation tasks. The reallocation of all program components takes place dynamically as a result of the method.

BRIEF DESCRIPTION OF THE DRAWINGS

The invention will be described in greater detail hereafter based on an exemplary embodiment with reference to the accompanying drawings.

In the drawings.

DETAILED DESCRIPTION

On a production line, for example, various automation tasks must be implemented. In particular in extensive production plants, these are assumed by a number of control devices such as programmable logic controllers (PLC), which can be connected to a control system via a network for data purposes. Such a data network can be composed in an Ethernet-based manner, such as PROFINET, and designed to provide all the input and output interfaces for all controllers across the system and/or network. This means that all hardware-based I/O interfaces and event interfaces are available within the entire data network for all subscribers in the network, so that the linking of the I/O interfaces takes place via the data network of PROFINET.

Figure 1:
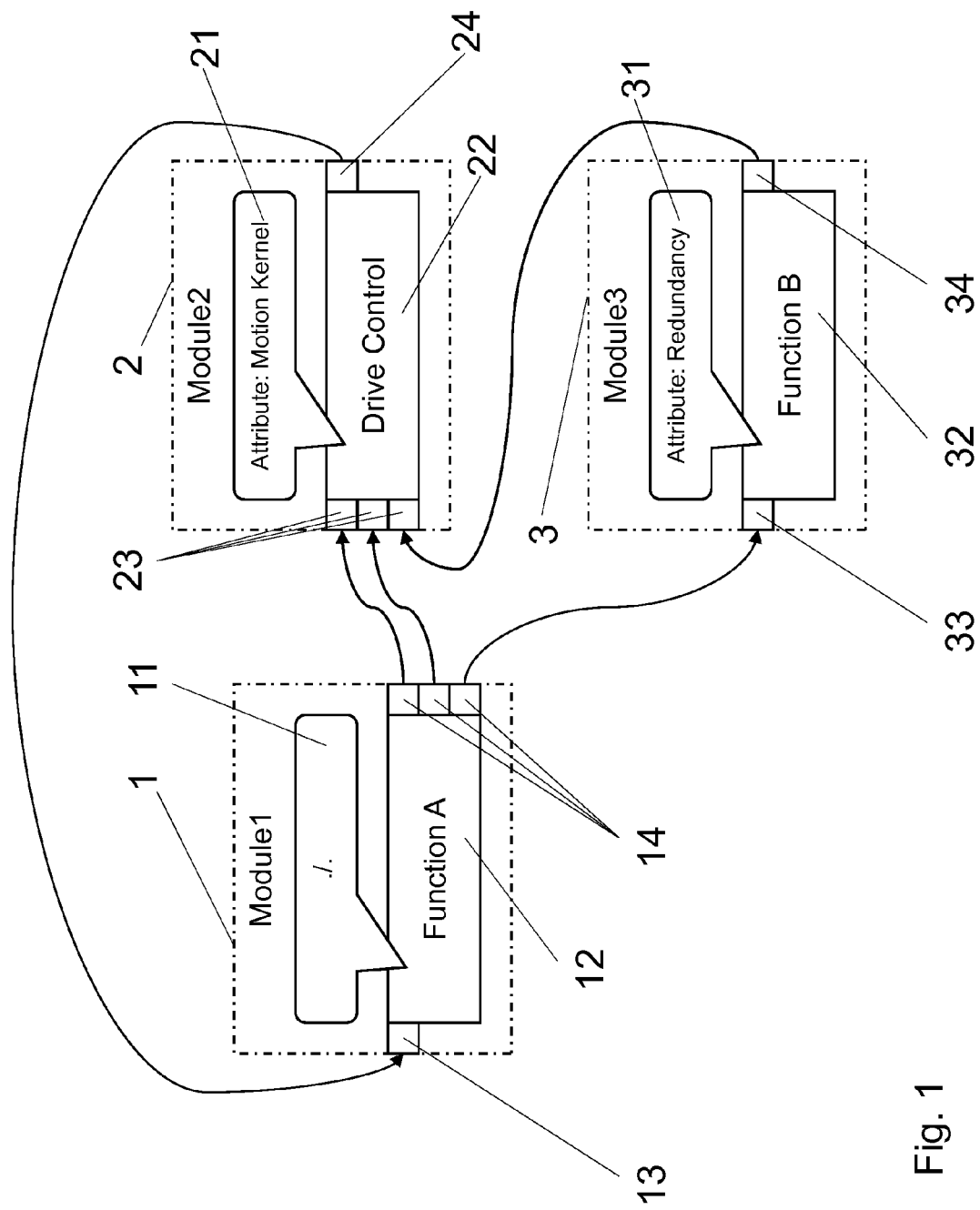
FIG. 1: shows three program modules which are linked to each other and each have a program function, a number of data interfaces and a performance parameter.

So as to achieve the respective automation task, first a computer-assisted development system is used to create an application-specific control program, which initially is independent of the hardware of a respective control system. FIG. 1 shows such a program for an exemplary automation task.

A number of program modules 1, 2, 3 in keeping with the automation tasks to be achieved is created for the creation of the control program. A program module essentially includes a program component as well as a performance parameter and a number of allocated data interfaces.

The program components 12, 22, 32 can, for example, be compiled from one or more instantiatable functions or function blocks, the I/O and event interfaces of which are each allocated to one of the data interfaces. The performance parameters of the program modules include information with requirements for a PLC that are necessary for carrying out the program module or the respective program component. The requirements can be used, for example, to define functional features of a PLC, such as the availability of a motion kernel or the availability of safety functions, or certain performance properties of a PLC could be established, such as the clock and cycle times and the like.

As can be seen from the example shown in FIG. 1, a program component 2, which includes a "Function A", as well as an input data interface 13 and a number of three output data interfaces 14 are allocated to the first program module 1. The program component 12 does not require any particular hardware resources or features of a PLC. The allocated performance parameter 11 of the first program module 1 thus does not contain any requirement data.

The second program module 2 likewise includes a second program component 22 and data interfaces 23, 24. The program component 22 is intended to implement drive control, which is required to run a motion kernel of a PLC. The performance parameter 21 thus includes the attribute "Motion Kernel", which is used to display the accordingly required functional feature of a PLC.

According to the present example, the third program component 32 allocated to the third program module 3 is intended to be executed redundantly on two different PLCs, assuring the bumpless transfer of the respective implemented automation task to another PLC (backup hardware) in the event of the failure of a control device. The performance parameter 31 accordingly includes the attribute "Redundancy".

The program modules 1, 2, 3 are linked to each other via the existing data interfaces 13, 14; 23, 24; 33, 34, wherein the links are shown in FIG. 1 by the connecting arrows.

Figure 3:
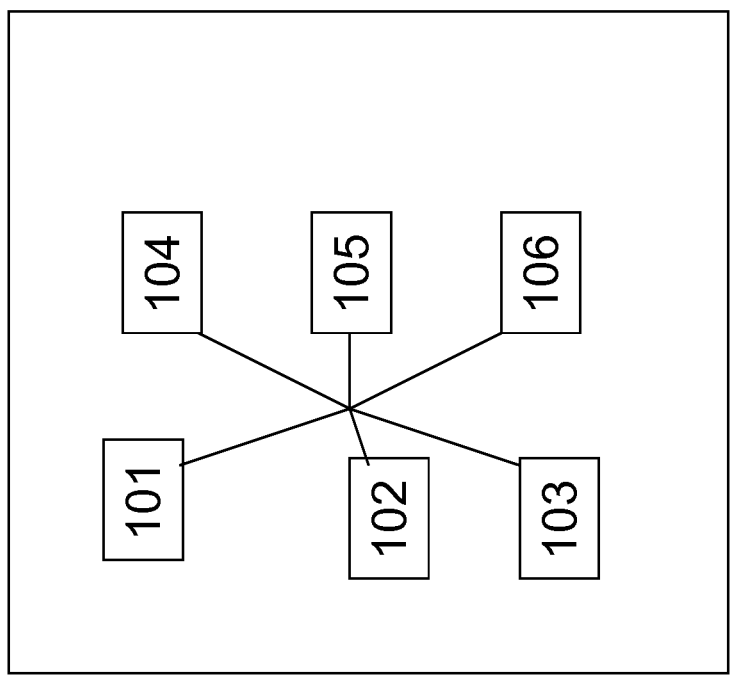
FIG. 3: shows a sketch of a development system according to the invention.

So as to complete the control program, the available hardware resources of the control systems to be programmed are finally announced to the development system (FIG. 3). This can be done automatically, for example, in that the development system is connected to the data network of the control system and independently reads out the available hardware.

Figure 2:
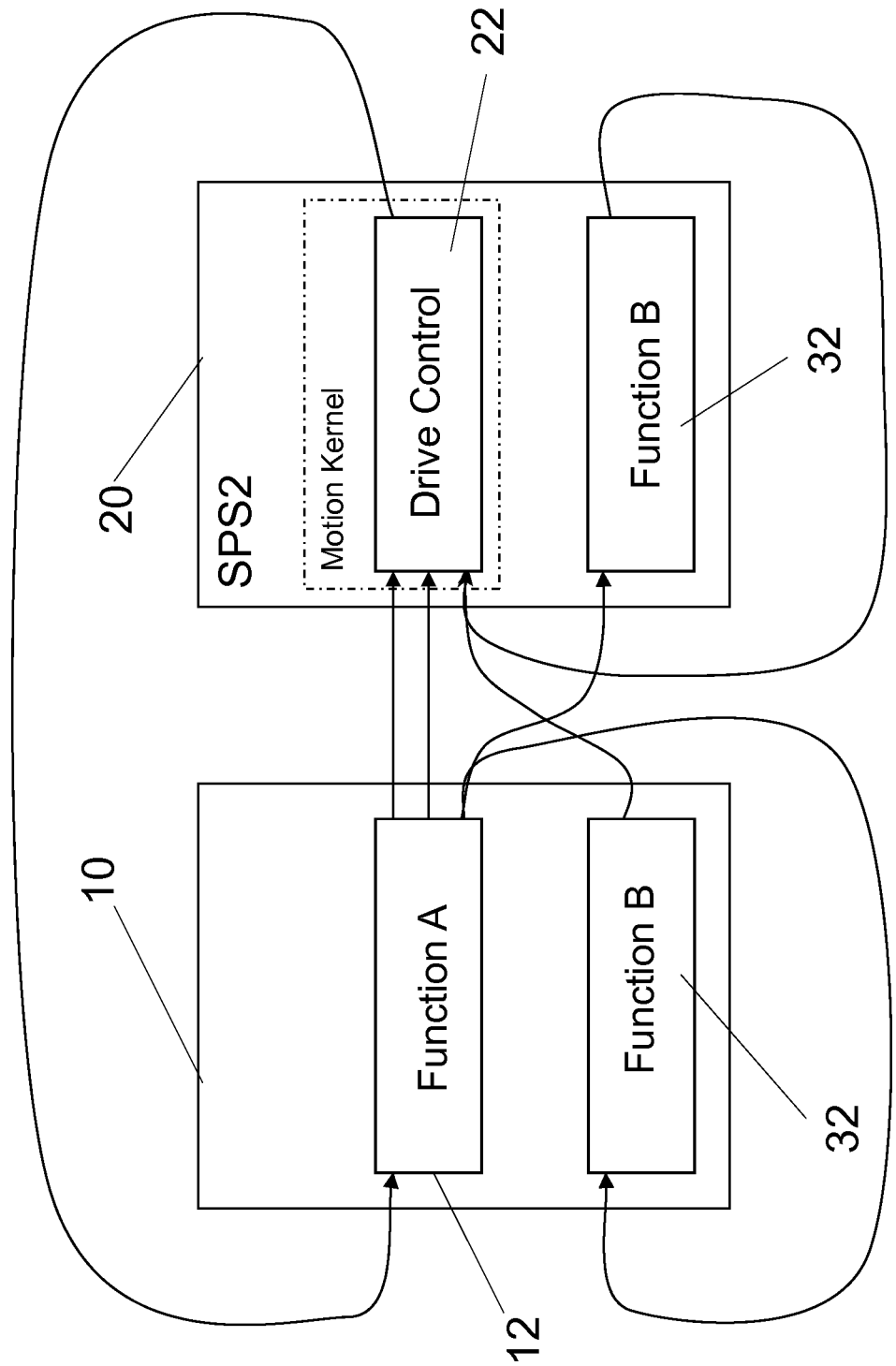
FIG. 2: shows two control devices (PLC) which are distributed in a control system and to which the program functions are allocated.

As can be seen in FIG. 2, the control system shown in the present example comprises two control devices distributed in a control system of a production line, these being a first PLC 10 and a second PLC 20. The second PLC 20 has the feature of a motion kernel, while the first PLC 10 provides only standard functions, which is to say no special features.

The development system now calculates the allocation of the program functions 12, 22, 32 of the program modules 1, 2, 3 while taking the specifications which were defined in the respective allocated performance parameters 11, 21, 32 into consideration.

For the drive control implemented with the program module 2, the development system must ensure that the control device on which the corresponding program function 22 is to be executed has the motion kernel required in the performance parameter 21. In the present example, the program function 22 is thus allocated to the second PLC 20.

According to the allocated performance parameter 31, it is imperative that the program function 32 of the third program module 3 is executed as redundant instances on two different control devices, and is thus allocated to the first PLC 10 and the second PLC 20.

No resource-related specifications must be met for the allocation of the program function 12 of the first program module 1. As part of further allocation criteria, such as uniform utilization of the hardware in the entire control system, the program function 12 is allocated to the first PLC 10.

The configuration of the I/O interfaces takes place based on the calculated allocation of the program functions to the respective controllers. For this purpose, the PROFINET controller of each control device is configured by the development system in keeping with the data interfaces allocated to the program functions and in accordance with the defined links.

If the production line is to be expanded at a later time by additional automation tasks, and thus by additional program functions or program modules, the development system can perform a new allocation, optionally under accordingly modified specifications for optimization of the allocation.

If the hardware resources in a control system have been exhausted, these can be easily expanded by adding further control devices to the data network. After the expanded or modified hardware has been announced to the development system, a dynamic reallocation of the program functions can take place. An originally created application-specific control program for an automation tasks, as shown in FIG. 1, can be maintained during the dynamic reallocation to a modified hardware of a particular control system. Optionally, only program modules which must be appropriately linked to the existing program modules are added to the control program for new automation tasks. It is advantageously not necessary to entirely reconfigure the automation program.

FIG. 3 is a sketch of a development system for carrying out the method described above. This system comprises an input device 101 for creating and linking at least two program modules 1, 2, 3, wherein each program module includes at least one program component, a number of data interfaces 13, 14, 23, 24, 33, 34 and a performance parameter 11, 21, 31, and wherein a requirement in regard to the performance capability of a control device 10, 20 for executability of the program module 1, 2, 3 is defined by way of the performance parameter; and an ascertainment device 102 for ascertaining a number and a performance capability of the distributed control devices 10, 20 available in a control system. The development system further comprises a comparison device 103 for verifying possible allocations of program modules 1, 2, 3 to the available control devices 10, 20, wherein the verification results from a comparison between the requirement according to the performance parameters 11, 21, 31 and the performance capabilities of the control devices 10, 20. The development system further comprises a selection device 104 for selecting a verified allocation of the program modules 1, 2, 3. The development system further comprises an allocation device 105 for allocating the program components to the distributed control devices 10, 20 according to the selected allocation of the program modules 1, 2, 3. The development system further comprises a configuration device 106 for configuring data exchange channels between the distributed control devices 10, 20, which is designed to appropriate implement the defined data connections between the allocated program modules 1, 2, 3.

What is claimed is:

1. A method for allocating program components of a control program to at least two control devices that are distributed in a control system, comprising the following steps:

a) creating at least two program modules, wherein each program module is allocated at least one program component, a number of data interfaces and a performance parameter, wherein the performance parameter defines a requirement in regard to the performance capability of a control device and/or a requirement in regard to the performance capability of data exchange channels between the control devices, which are required to be able to execute the program module;

b) linking the program modules among each other to form a control program, wherein data connections are defined between the data interfaces;

c) ascertaining the number and the respective performance capability of the distributed control devices that are available in the control system;

d) ascertaining a number of possible allocations of the program modules to the available control devices, wherein the possible allocations are verified by a comparison between the requirement in regard to the performance parameters and the performance capability of the control devices;

e) selecting a verified allocation of the program modules and corresponding allocation of the program components thereof to the distributed control devices; and f) configuring data exchange channels between the distributed control devices, wherein the defined data connections between the allocated program modules are implemented accordingly.

2. The method according to claim 1, wherein according to step e) an allocation is selected that allows essentially uniform utilization of the control devices.

3. A method according to claim 1, wherein an attribute is provided in the performance parameters, wherein the attribute is used to establish whether a program module requires a particular performance characteristic in the control device for executability.

4. A method according to claim 1, wherein a value for the quality of service for the data connections is provided in the performance parameters.

5. A method according to claim 1, wherein an attribute is provided in the performance parameters, wherein the attribute is used to establish whether a program module is to be redundantly executed on a number of different control devices.

6. A development system comprising:

a processor configured to perform the steps of:

creating and linking at least two program modules, wherein each program module includes at least one program component, a number of data interfaces and a performance parameter, and wherein a requirement in regard to the performance capability of a control device and/or a requirement in regard to the performance capability of data exchange channels that is required for executability of the program module is defined by way of the performance parameter;

ascertaining a number and a performance capability of the distributed control devices available in a control system;

verifying possible allocations of program modules to the available control devices, wherein the verification results from a comparison between the requirement according to the performance parameters and the performance capabilities of the control devices;

selecting a verified allocation of the program modules;

allocating the program components to the distributed control devices according to the selected allocation of the program modules; and configuring data exchange channels between the distributed control devices, which is designed to appropriately implement the defined data connections between the distributed program modules.

\* \* \* \* \*